Jan. 22, 1957 J. W. GIFFEN 2,778,162
CENTRIFUGAL CASTING OF GLASS ARTICLES
Filed April 12, 1954

INVENTOR.
JAMES W. GIFFEN
BY Clarence R. Patty, Jr.
ATTORNEY.

United States Patent Office 2,778,162
Patented Jan. 22, 1957

---

2,778,162

CENTRIFUGAL CASTING OF GLASS ARTICLES

James W. Giffen, Corning, N. Y., assignor to Corning Glass Works, Corning, N. Y., a corporation of New York Application April 12, 1954, Serial No. 422,379

1 Claim. (Cl. 49—85)

The present invention relates to the direct casting of a glass body having an aperture through its wall by centrifuging or so-called "spinning" of molten glass to the desired form in a suitable forming mold.

Method of centrifugally casting or "spinning" imperforate side-wall tubular glass articles from charges of molten glass fed into suitable molds that are rotated in a vertical plane about their axes to suitably distribute the glass over their walls are known from United States patents to Luertzing, Nos. 2,349,046, 2,350,052, 2,361,533, and 2,366,118. A method of centrifugally casting or "spinning" similar articles from charges of molten glass introduced in a mold rotated in a horizontal plane about its axis is also known from Patent No. 1,301,378. Moreover, a method of centrifugally casting or "spinning" a glass bushing having an imperforate side-wall in a mold rotatable in a horizontal plane about its axis and showing the charging of the mold by directing a stream of glass thereinto preceding rotation of the mold is known from Patent No. 2,478,624.

My co-pending application, Serial No. 422,380 filed on even date herewith in common with the present application also teaches a method of centrifugally casting glass bodies having wall apertures.

The primary object of the present invention is an economical and practicable method of centrifugally casting perforate wall glass articles.

According to the invention the centrifugal casting or "spinning" of tubular glass bodies having perforations through the walls thereof is readily effected by use of a mold having islands on its cavity defining wall surface around which islands the glass can be centrifuged. If the diameter of the article to be cast is such that its mold affords clearance past the aperture forming islands for the deposit of a single molten glass charge of the volume required to form the article the mold may be rotated with its axis vertical. If, however, the article to be cast is of such small diameter that charging of the mold with a single gob of glass is impracticable because of the obstructions introduced by the islands thereof, the mold may be charged from a stream of molten glass. Moreover, to facilitate introduction of molten glass in the form of a stream into a mold of small cavity diameter without the glass being intercepted by an aperture forming island, the mold is preferably rotated about its axis while in an inclined plane. By such stream feed method the mold, while rotating at a high speed, intercepts a stream of molten glass at a level above any of its aperture forming islands, and by the combined action of centrifugal force and gravity such glass is then distributed or spun over the entire cavity wall surface and around such islands. The supply of glass to the mold is discontinued shortly before "spinning" of the article has been completed.

The gob feed method differs from the stream feed method only to the extent that it is carried out while the mold is rotating about a vertical axis. By such method it is more difficult to avoid formation of a bottom on the article formed, however, since the charge is initially deposited on the mold bottom and must be centrifuged therefrom and up the mold wall against the action of gravity.

Obviously, if the exterior wall configuration of the article to be cast is such that it can be withdrawn from the mold in the absence of the islands, a block mold can be employed with the islands normally projected through suitable mold-wall apertures and partly withdrawn to permit removal of the cast article from the mold. If the shape of article to be cast does not permit use of a block mold a laterally separable mold may be employed to facilitate removal of the article therefrom. Under the latter circumstances the islands may conveniently be made integral with the respective mold sections.

For the purpose of a better understanding of the invention the same has been illustrated in the accompanying drawing as applied to the production of an open insulator housing comprising a tubular body having an aperture transversely therethrough and of a shape requiring formation in a laterally separable mold. Since a relatively small diameter article is to be cast in this instance the stream feed method has been illustrated.

In the drawing—

Figure 1:
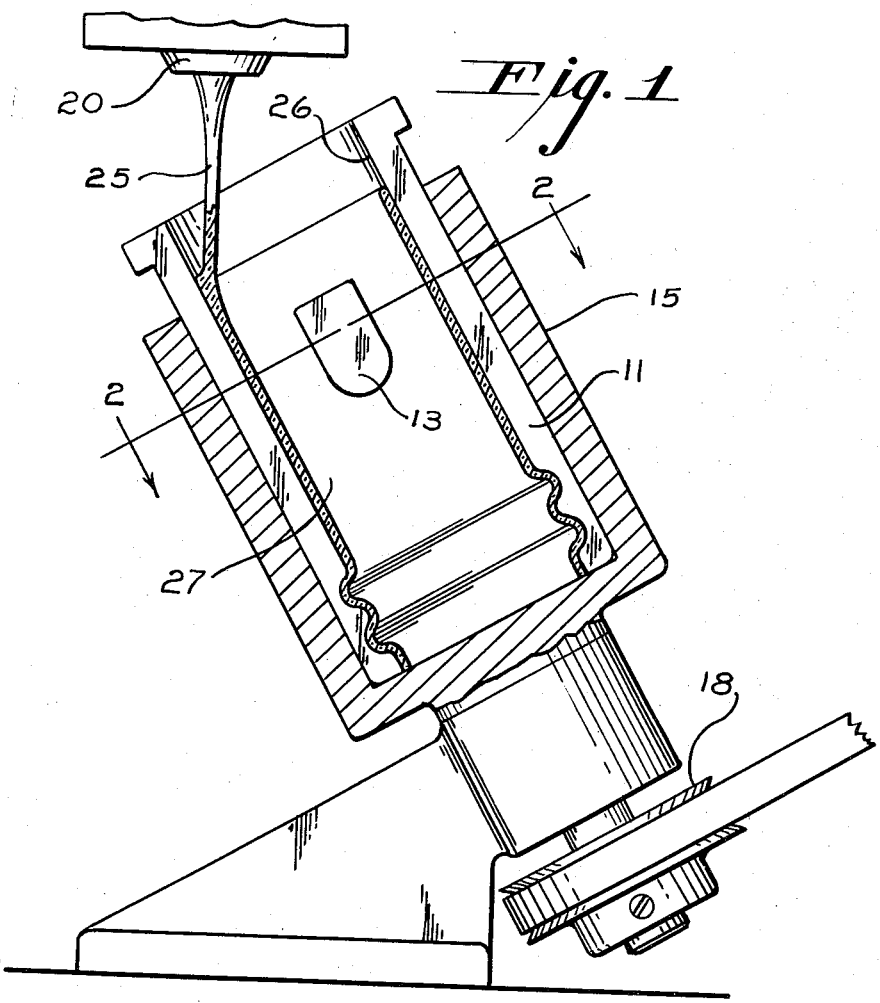
Fig. 1 is a side elevation of a support for a tubular mold comprising a cup-like shell, shown in section, arranged for rotation about its axis in an inclined plane, and shows one of two axially separable sections of a mold intercepting a stream of molten glass being fed thereinto with an article substantially fully formed therein.
Figure 2:
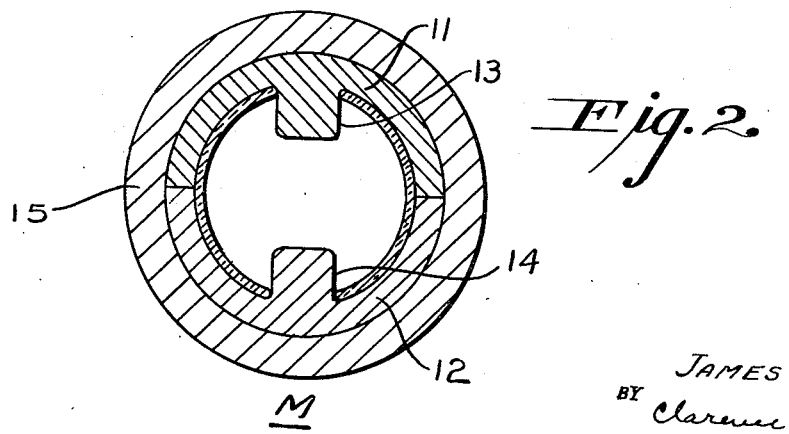
Fig. 2 is a sectional view taken on line 2—2 of Fig. 1.

Referring to the drawing in detail, the numeral 11 designates one of two axially separable mold halves 11 and 12, respectively of a mold M. Mold half 11 is provided on its cavity forming surface with an island 13 and mold half 12 is provided with a similar island 14. As shown the mold halves 11 and 12 are held laterally confined within a cup 15 adapted for rotation in an inclined plane about the mold cavity axis. A feeder outlet 20 is shown directing a stream 25 of molten glass into the mold. A pulley 18 is shown to indicate a means of effecting mold rotation. A tubular open insulator housing 27 is illustrated as substantially completely formed.

*Operation*

When the disclosed apparatus is employed, stream 25 is directed into the mold M only after it has attained a suitable speed of rotation. As will be observed, with the mold M in the indicated inclined position shown, the glass stream is intercepted by the mold cavity forming side-wall 26 at a point above the perforation forming islands 13 and 14 and that gravity aids centrifugal action in the distribution of glass over the lower regions of the mold side-wall.

The centrifugal formation of articles in the fashion illustrated can be successfully carried out with glass having any viscosity between 20 and 175 poises by rotation of the mold at between 1500 and 2000 R. P. M. Rotation of the mold at lower speeds, or with the glass at viscosities under 175, or commencement of rotation after the introduction of glass into the mold, is likely to produce incomplete articles or articles closed or at least partly closed at their bottom ends. Using glass at a viscosity of about 20 poises satisfactory articles of approximately the size of the mold cavity shown can be cast from as little as 150 grams of glass (density 5.4). On the other hand at a viscosity of 175 poises the addition of approximately 250 grams of glass is required to produce a complete article. As will be understood by those familiar with glass working practices, preheating of the mold prior to the casting operation is necessarily resorted to to prevent too rapid cooling and consequent fracture or checking of the cast article.

Although the invention has been described as applied to the casting of a perforate wall tubular body in an inclined mold from glass supplied to the mold from a stream thereof, as previously mentioned, it is within the concept of this invention to centrifuge similarly shaped articles by depositing a gob of molten glass in a mold while the same is being rotated about a vertical axis passing through its axial center.

What is claimed is:

The method of forming a tubular article which includes rotating a mold having a cylindrical cavity about the axial center of such cavity while in a plane intermediate to horizontal and vertical, directing a vertically flowing stream of glass, of small cross section compared to the mold cavity cross section, against the cavity wall near its upper end to feed and distribute glass over the mold surface by means of gravity and centrifugal action to form such an article within such mold cavity, and retaining the article in intimate contact only with the mold cavity wall solely by centrifugal action until the glass becomes set.

References Cited in the file of this patent

UNITED STATES PATENTS

| | | |
|---|---|---|
| 1,527,729 | Dunajeff | Feb. 24, 1925 |
| 1,751,766 | Smith | Mar. 25, 1930 |
| 2,042,015 | Moormann | May 26, 1936 |
| 2,667,722 | Jenkins | Feb. 2, 1954 |
| 2,683,332 | Litalien et al. | July 13, 1954 |